(12) United States Patent
Grampassi

(10) Patent No.: US 9,233,829 B2
(45) Date of Patent: Jan. 12, 2016

(54) APPARATUS FOR DISPENSING REFRIGERATED PRODUCTS

(71) Applicant: S.P.M. DRINK SYSTEMS S.P.A., Spilamberto (IT)

(72) Inventor: Enrico Grampassi, Spilamberto (IT)

(73) Assignee: S.P.M. DRINK SYSTEMS S.P.A., Spilamberto (MO) (IT)

( * ) Notice: Subject to any disclaimer, the term of this patent is extended or adjusted under 35 U.S.C. 154(b) by 0 days.

(21) Appl. No.: 14/349,791

(22) PCT Filed: Oct. 2, 2012

(86) PCT No.: PCT/EP2012/069495
§ 371 (c)(1),
(2) Date: Apr. 4, 2014

(87) PCT Pub. No.: WO2013/050389
PCT Pub. Date: Apr. 11, 2013

(65) Prior Publication Data
US 2014/0231047 A1   Aug. 21, 2014

(30) Foreign Application Priority Data

Oct. 6, 2011 (IT) .......................... BO2011U0076 U

(51) Int. Cl.
| | | |
|---|---|---|
| *B67D 7/80* | (2010.01) | |
| *A23G 9/22* | (2006.01) | |
| *A23G 9/28* | (2006.01) | |
| *B67D 7/84* | (2010.01) | |
| B67D 1/08 | (2006.01) | |
| A23G 9/04 | (2006.01) | |
| F25D 31/00 | (2006.01) | |
| B67D 3/00 | (2006.01) | |

(52) U.S. Cl.
CPC .. *B67D 7/80* (2013.01); *A23G 9/22* (2013.01); *A23G 9/281* (2013.01); *B67D 7/84* (2013.01); *A23G 9/045* (2013.01); *B67D 1/0857* (2013.01); *B67D 1/0867* (2013.01); *B67D 3/0009* (2013.01); *F25D 31/002* (2013.01)

(58) Field of Classification Search
CPC .. F25D 31/002; B67D 1/0857; B67D 1/0867; B67D 3/009; B67D 7/80; B67D 7/84; A23G 9/22; A23G 9/045; A23G 9/281
USPC ............... 222/129.1, 146.6, 145.5–145.6, 63; 62/389–390
See application file for complete search history.

(56) References Cited

U.S. PATENT DOCUMENTS 2,559,840 A * 7/1951 Arthur ............................ 222/61
5,799,832 A * 9/1998 Mayo ............................ 222/135
(Continued)

FOREIGN PATENT DOCUMENTS

| IT | MO2009A000259 A1 | 4/2011 |
|---|---|---|
| JP | 2001 231456 A | 8/2001 |
| JP | 2001 245602 A | 9/2001 |

*Primary Examiner* — Frederick C Nicolas
(74) *Attorney, Agent, or Firm* — McGlew and Tuttle, P.C.

(57) ABSTRACT

The apparatus for dispensing refrigerated products includes at least one containment tank (2) mounted above a base body (6) and suitable to contain the product to be dispensed. Inside the tank (2) a mixing device suitable to perform the continuous circulation of the product inside the tank (2) and a cooling device for cooling the product are arranged. A dispensing device (3) for the product, placed at the front zone of the containment tank (2) is provided with a tap (4) which can be operated by an external lever member (5). The base body (6) carries frontally applied a ventilation member (10) suitable to produce a hot airflow which comes out from lower openings (13).

5 Claims, 2 Drawing Sheets

(56) References Cited

U.S. PATENT DOCUMENTS

| | | |
|---|---|---|
| 5,816,455 A | 10/1998 | Alpers et al. |
| 6,553,779 B1 * | 4/2003 | Boyer et al. .................. 62/342 |
| 6,619,056 B2 * | 9/2003 | Midden et al. .................. 62/136 |
| 8,887,522 B2 * | 11/2014 | Grampassi ...................... 62/342 |
| 8,973,786 B2 * | 3/2015 | Minard et al. ............. 222/146.6 |
| 2012/0240611 A1 | 9/2012 | Grampassi |

* cited by examiner

APPARATUS FOR DISPENSING REFRIGERATED PRODUCTS

TECHNICAL FIELD

The present invention regards an apparatus for dispensing refrigerated products, such as water ices, creamy ice-creams, sorbets and the like.

BACKGROUND ART

Nowadays apparatuses which allow to prepare and dispense refrigerated products of the type of traditional water-based water ice or alternatively creamy products such as creamy ice-creams, sorbets, coffee creams and other frozen products are known.

Such known apparatuses are generally constituted by a tank suitable to contain the product to be dispensed, wherein a cooling device for cooling the product to the appropriate temperature and a mixing device which causes the continuous circulation of the product inside the tank are arranged. The circulation device, consisting for example of a screw member driven in rotation according to an axis longitudinal to the tank, is suitable to convey the cooled product towards a front zone, where a dispensing device for the product is arranged. The dispensing device is provided with an obturator element which can be operated by means of an external lever member.

The containment tank for the product is arranged above a base body of substantially prism-shaped profile, which is suitable to contain in its inside the actuation members of the apparatus, in particular the compressor of the cooling device and the motor member of the circulation device.

A problem existing in the specific field concerns the necessity of controlling in an appropriate manner the value of temperature inside the base body. As a matter of facts, when such temperature rises, the performance of the compressor of the cooling device lowers, while the consumption increases. Moreover a lower temperature assures a better endurance of the apparatus. Nevertheless, known solutions do not allow to easily satisfy such necessity.

DISCLOSURE

The task of the present invention is that of solving the aforementioned problems, devising an apparatus for dispensing refrigerated products which allows to perform a suitable cooling of the actuation members inside the base body of the same apparatus.

Another scope of the present invention is that of providing an apparatus for dispensing refrigerated products having a simple conception, a securely reliable functioning and versatile use, as well as relatively economic costs.

The cited scopes are attained, according to the present invention, by the apparatus for dispensing refrigerated products according to claim 1.

According to the present invention, the apparatus for preparing refrigerated products comprises at least a containment tank mounted above a base body which carries frontally applied a ventilation member suitable to produce a hot airflow which comes out from lower openings.

DESCRIPTION OF DRAWINGS

Details of the invention shall be more apparent from the detailed description of a preferred embodiment of the apparatus for dispensing refrigerated products according to the invention, illustrated for indicative purposes in the attached drawings, wherein.

BEST MODE

Figure 1:
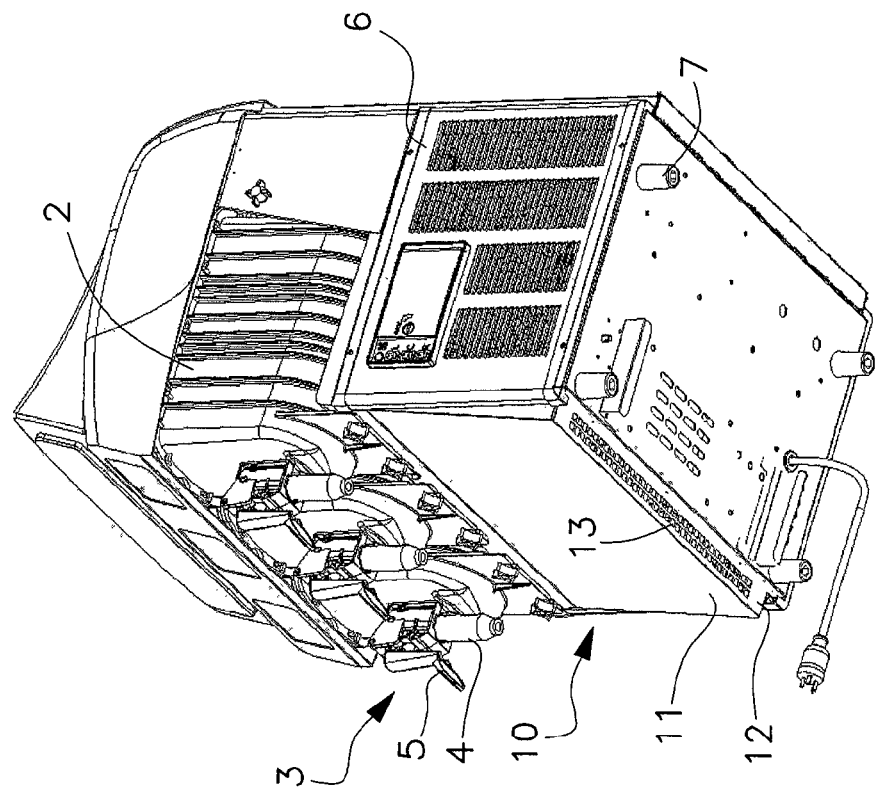
FIG. 1 shows a perspective view of the apparatus for dispensing refrigerated products.
Figure 2:
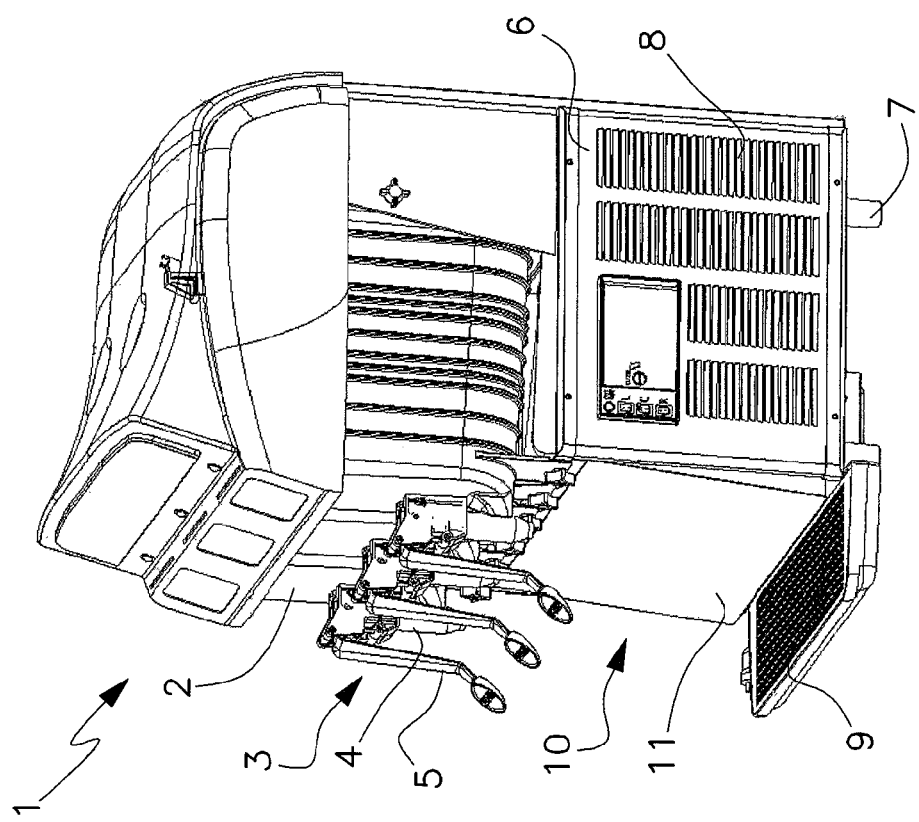
FIG. 2 shows a corresponding perspective view taken from the bottom.
Figure 3:
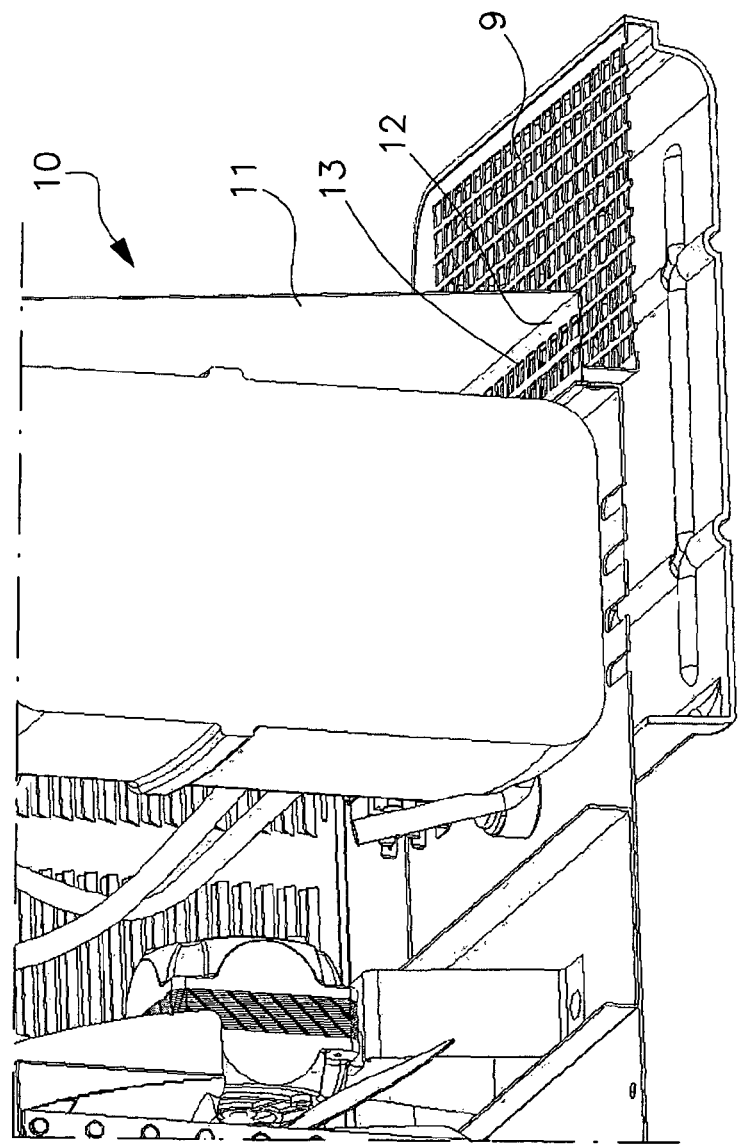
FIG. 3 shows a detailed view of the front zone of the apparatus in section according to a median longitudinal plane.

With particular reference to such figures, the apparatus for dispensing refrigerated products, such as water ice, creamy ice-creams, sorbets and the like, according to the invention is indicated in its entirety with 1.

The apparatus 1 comprises at least a tank 2 for containing the product to be dispensed, made preferably of plastic transparent material, as disclosed for example in patent application no. MO2009A000259 in the name of the Applicant. In the illustrated embodiment, the apparatus is provided with three containment tanks, for dispensing different kinds of products. Anyway it is possible to provide the apparatus with a different number of tanks, for example one single or two.

Inside each containment tank 2 a mixing device is arranged, in known way, comprising for example a screw member driven in rotation according to an axis longitudinal to said tank, for performing the continuous circulation of the product inside the said tank. Moreover inside the tank 2 a cooling device is arranged for cooling the product until the suitable temperature, being substantially made by a coil evaporator; the evaporator is connected to a conventional refrigerating system provided with a suitable compressor.

Each containment tank 2 frontally has a dispensing device 3 provided with a tap 4 which can be operated by means of an external lever member 5.

The containment tanks 2 are mounted above a base body 6 of substantially prism-shaped profile. The base body 6 is suitable to contain in its inside the actuation members of the apparatus, such as in particular the compressor of the cooling device and the motor member of the circulation device, known per se and not described in more detail. The base body 6 comprises for example a sheet frame mounted on feet 7 and having on the lateral walls ventilation openings 8.

At the frame base 6, at the front wall, a tub 9 is mounted for collecting the possible product dropping from the dispensing devices 3. The tub 9 is suitably removable for the periodic cleaning operations.

The base body 6 carries frontally applied a ventilation member 10 suitable to produce a hot airflow coming out from lower openings 13. More in particular, the ventilation member 10 comprises a panel 11 which frontally closes the frame 6 and which is also made of sheet; such panel 11 suitably extends on a plane leaning forward, top down, so as to shape inferiorly an horizontal wall 12 in which the cited openings 13 are made.

The functioning of the apparatus for dispensing refrigerated products is easy to understand from the preceding description.

The apparatus attains the scope of assuring an appropriate cooling of the actuation members inside the base body of the same apparatus.

The ventilation member 10 made by the front panel 11 allows in fact to expel hot air from the openings 13 of the wall 12, keeping the inner temperature in the frame 6 at a relatively low value. This entails an improvement of the performance of the compressor of the cooling device and a relative lowering of consumption, as well as a better endurance of the apparatus.

Another advantage of the cited ventilation member comes from the fact that the hot airflow coming out front the openings 13 is directed downwards, so as to directly sweep the tube 9 below. This enables to keep the same tub 9 dry during the functioning of the apparatus.

The apparatus described for indicative purpose is susceptible of numerous modifications and variants according to the different exigencies.

In practice, the embodiment of the invention, the materials used, as well as the shape and dimensions, may vary depending on the requirements.

Should the technical characteristics mentioned in each claim be followed by reference signs, such reference signs were included strictly with the aim of enhancing the understanding the claims and hence they shall not be deemed restrictive in any manner whatsoever on the scope of each element identified for exemplifying purposes by such reference signs.

The invention claimed is:

1. An apparatus for dispensing refrigerated food products, the apparatus comprising:
    at least a containment tank mounted above a base body for containing a product to be dispensed;
    a mixing device arranged inside said at least said containment tank for performing a continuous circulation of the product inside said at least said containment tank, for conveying the product towards a front zone of said at least said containment tank;
    a cooling device arranged inside said at least said containment tank for cooling said product;
    a dispensing device for the product, placed at said front zone of the at least said containment tank, wherein said base body carries frontally applied a ventilation member suitable to produce a hot airflow coming out from lower openings, said ventilation member comprising a panel which frontally closes said base body, said panel extending on a plane leaning forward, top down, so as to inferiorly define a horizontal wall in which said openings are made.

2. An apparatus according to claim 1, wherein said openings are turned downwards so as to drive said hot airflow towards a collecting tub placed below, associated with said base body.

3. An apparatus according to claim 1, wherein said panel is made of folded sheet.

4. An apparatus according to claim 1, wherein said panel comprises a folded sheet.

5. An apparatus for dispensing refrigerated food products, the apparatus comprising:
    at least a containment tank mounted above a base body for containing a product to be dispensed;
    a mixing device arranged inside said at least said containment tank for performing a continuous circulation of the product inside said at least said containment tank, for conveying the product towards a front zone of said at least said containment tank;
    a cooling device arranged inside said at least said containment tank for cooling said product;
    a dispensing device for the product, placed at said front zone of the at least said containment tank, wherein said base body carries frontally applied a ventilation member suitable to produce a hot airflow coming out from lower openings, said ventilation member comprising a panel which frontally closes said base body, said openings being turned downwards so as to drive said hot airflow towards a collecting tub placed below, associated with said base body.

* * * * *